United States Patent [19]
Emter

[11] Patent Number: 5,351,578
[45] Date of Patent: Oct. 4, 1994

[54] RESILIENT COMPRESSIBLE CLAMPING SURFACE FOR CIRCULAR SAW BLADES

[76] Inventor: James Emter, 200 NW. 267th Cir., Ridgefield, Wash. 98642

[21] Appl. No.: 984,175

[22] Filed: Nov. 20, 1992

[51] Int. Cl.⁵ .............................................. B23D 63/14
[52] U.S. Cl. ........................................ 76/41; 76/112; 451/403
[58] Field of Search ............ 51/74 BS, 80 BS, 81 BS, 51/82 BS, 83 BS, 84 BS, 85 BS, 86 BS, 91 BS, 92 BS, 98 BS, 109 BS, 216 ND, 225, 125; 76/48, 76, 78.1, 79, 112, 41, 79.5

[56] References Cited

U.S. PATENT DOCUMENTS

| | | | |
|---|---|---|---|
| 3,952,616 | 4/1975 | Varley | 51/216 ND |
| 4,088,358 | 2/1992 | Emter | 76/112 |
| 4,102,224 | 7/1978 | Wright | 51/216 ND |
| 4,655,006 | 4/1987 | Block | 51/168 |
| 4,729,193 | 3/1988 | Gant et al. | 51/168 |
| 4,846,023 | 7/1989 | Emter | 76/41 |
| 5,152,193 | 10/1992 | Emter | 76/41 |

*Primary Examiner*—Jack W. Lavinder
*Attorney, Agent, or Firm*—Chernoff, Vilhauer, McClung & Stenzel

[57] ABSTRACT

A saw regrinding machine includes a circular saw blade mounted for rotation about an axis and having an indexing assembly. A side clamp secures the blade during a regrinding operation to prevent its movement and includes side clamping members having a clamping surface for frictionally engaging the surface of the saw blade that includes a surface portion formed of a resilient compressible material. During indexing the saw blade slides across the deformable resilient material but is not scratched or scuffed. The invention also provides a resilient compressible material as part of the surface of a slip clutch assembly in the form of O-rings surrounding magnetic members embedded in the surface of a flat plate. While magnetic attraction holds the saw blade in place against the plate, rotation is permitted where only the soft compressible O-rings are in contact with the surface of the saw blade. In this way rotation of the saw blade is accomplished without scratching or scarring its surface.

9 Claims, 2 Drawing Sheets

RESILIENT COMPRESSIBLE CLAMPING SURFACE FOR CIRCULAR SAW BLADES

BACKGROUND OF THE INVENTION

The present invention relates to a side clamp for use in a saw regrinding machine for holding a circular saw blade in place during a sharpening operation without scratching or marring the painted or coated surface of the blade.

Manufacturers of saw blades for commercially available products of the type commonly sold in hardware stores now require that these saw blades be painted or coated with TEFLON ® (polytetrafluoroethylene) prior to sharpening. It is important for appearance sake that the finish or coating not be scarred or scratched since the saw blade will be displayed in packaging for purchase by a retail consumer. It is necessary, however, to sharpen the saw blade after it has been painted or coated since the paint or coating would dull the edges of the blades if applied after sharpening.

Most saw regrinding machines are of the type that sharpen a saw blade by applying side clamps to the blade from either side, sharpening a particular tooth, and then indexing the saw blade, allowing it to slide over the side clamps before the clamps are tightened to sharpen the next tooth in sequence. This is a problem with most saw regrinding machines because when the saw is clamped by the side-to-side clamps, enough pressure remains on the saw blade while indexing to cause the clamps to scratch the coating on the blade's surface.

Usually the clamps are made of metal so as to be rigid enough to hold the saw blade in place while it is being sharpened. Some manufacturers have tried to overcome the problem of scratching by using a hard plastic material as a side clamp. The hard plastic, however, does not have enough lateral strength to prevent the saw blade from bending or shifting during the regrinding process, and this impairs the accuracy of the sharpening operation.

Typically the side clamps that are used in commercial saw regrinders are two side-by-side clamps, one on either side of the saw blade, having a diameter of about one inch to an inch and a half. During sharpening the clamps are applied to the surface of the saw blade with a pressure of about 150 lbs from either side. The pressure is then partially released to exert only about one to ten pounds on the saw blade while it is indexed by a finger or some other common type of indexing mechanism. There must be enough friction from the side clamps to keep the saw blade from spinning freely so that the indexing mechanism will accurately align the next tooth in sequence for sharpening.

Therefore, friction must be continuously applied to the saw blade by the side clamps, but the side clamps will scratch the painted or coated surface of the saw blade as it rotates during indexing.

SUMMARY OF THE INVENTION

The present invention provides an improvement in saw regrinding machines having a circular saw blade mounted for rotation about an axis and a side clamp assembly for securing the blade during a regrinding operation to prevent its movement. According to the invention, the side clamp assembly has at least one clamping member with a clamping surface for frictionally engaging the surface of the circular saw blade where the clamping member includes a surface portion formed of a resilient, deformable or compressible material.

The resilient compressible material can provide enough friction during indexing to keep the saw blade from spinning freely but compresses when the side clamps are tightened during sharpening to provide a second larger surface area with enough lateral stiffness to hold the blade in place. Because the blade is static during sharpening, the second surface portion, which may be made of metal, will not cause scuffing or scratching of the surface. When pressure is released during indexing, the only surface portion applying frictional pressure is the deformable resilient surface which may comprise a rubber O-ring that projects outwardly of the metal surface of the side clamp by about ten thousandths of an inch. The rubber O-ring will not scuff or mark the surface of the coated circular saw blade.

Sometimes saw regrinding machines employ a magnetic slip clutch which is used for indexing. An example of such an arrangement is shown in U.S. Pat. No. 5,152,193 issued to James Emter on Oct. 6, 1992 and entitled "Combination Top And Side Grinding Machine For Circular Saw Blades." In an arrangement of this type the magnetic slip clutch, which may include a plurality of magnets embedded in a hardened surface material, may include inserts made of a resilient deformable material such as rubber. The magnets exert enough force on the saw blade to keep it pressed against the slip clutch member while the resilient deformable surface inserts are the portions actually in contact with the surface of the saw blade. The rotation of the slip clutch, therefore, will not scar or scuff the surface of the blade.

A principal object of this invention is to provide a side clamp assembly for use in a regrinding machine for a circular saw blade that permits proper indexing of the saw blade and an accurate sharpening operation without scarring or scratching its painted or coated surface.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

A circular saw blade 10 is mounted on a spindle 12 which is part of a circular saw blade sharpening machine (not shown). Typical saw regrinding machines of this type are shown in the Wright, U.S. Pat. No. 4,102,224 entitled "Grinding Machine With Means For Advancing A Saw," and in Emter U.S. Pat. No. 4,846,023 entitled "Regrinding Apparatus For Circular Saws."

In many circular saw regrinding machines of the general type noted above a side clamp mechanism is employed for holding the blade stationary while the saw is being sharpened. A saw clamping mechanism of this type may include clamp arms 14a and 14b which are journalled to receive clamp members 16a and 16b. The clamp arms 14a and 14b are connected to any suitable mechanism (not shown) for alternately exerting pressure on the circular saw blade 10 during sharpening and in releasing pressure on the blade during indexing.

Figure 1:
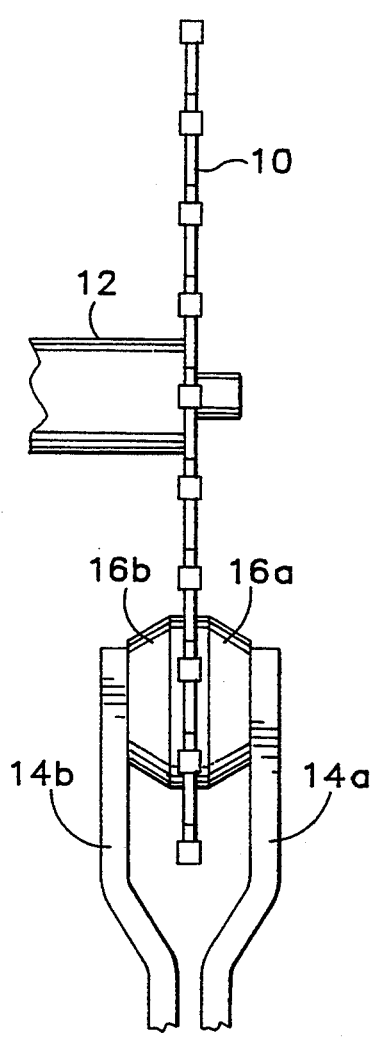
FIG. 1 is a partial elevation view of a saw regrinding machine including a side clamp assembly employing the present invention.
Figure 2:
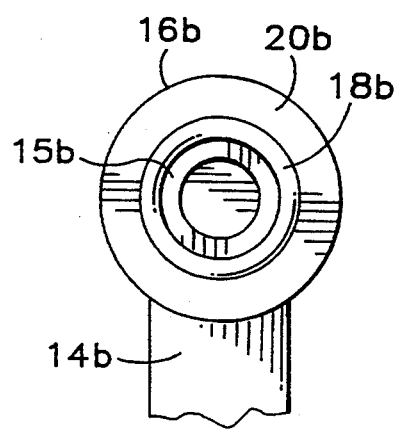
FIG. 2 is a partial side elevation view of one of the side clamp members shown in FIG. 1.
Figure 3A:
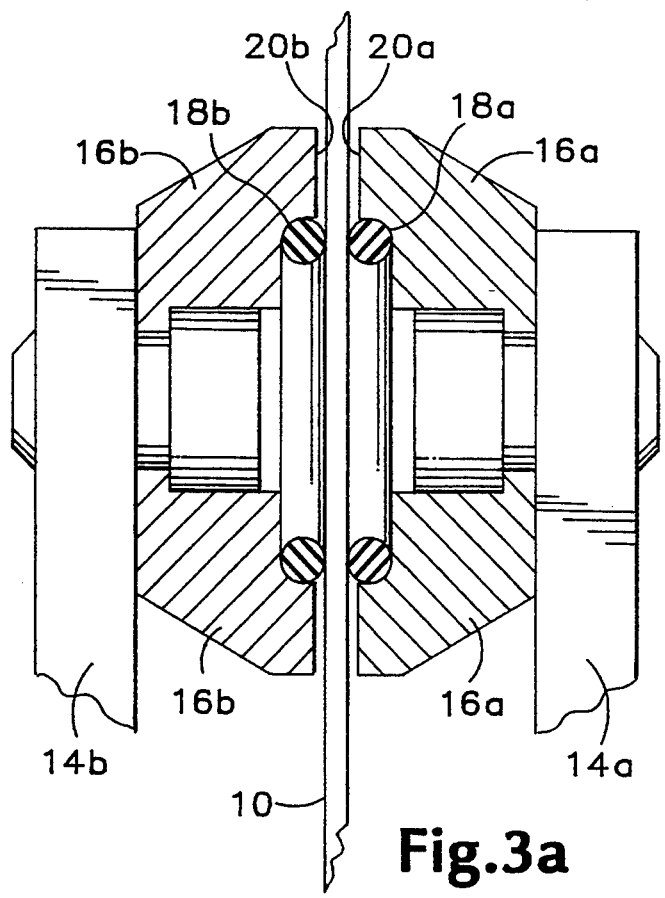
FIG. 3a is a partial front cutaway view of the side clamp assembly shown in FIG. 1 with the pressure of the side clamp members set to allow indexing of the saw blade.

Referring now to FIG. 2, the clamp member 16b includes a first surface portion 18b which may take the form of a resilient and deformable rubber O-ring 19b. This O-ring is press fitted into a recess 15b of a second surface portion 20b of the clamp member 16b. The second surface portion 20b is an annular metal surface formed of essentially the same material that forms the body of the clamp member 16b. Referring now to FIG. 3a it can be seen that when the pressure from the side clamp mechanism is relaxed, only the first surface portions 18a and 18b consisting of the O-ring members 19a and 19b are in actual contact with the surface of the saw blade 10. The pressure that is usually exerted during this time is between one and ten pounds. Just enough friction is applied by the O-rings 19a and 19b to keep the blade 10 from spinning freely during indexing. This ensures accuracy in the indexing mechanism (not shown), and at the same time, the saw blade 10 slides across the O-rings 19a and 19b without being scratched or scarred. Thus, the finish of the blade, whether it be coated with TEFLON ® or painted, will not be adversely affected by the saw regrinding operation.

The dimensions of the O-rings 19a and 19b are such that the surfaces of the O-rings project outwardly from the second surface portions 20a and 20b of the clamp members 16a and 16b, respectively, by about ten thousandths of an inch. This is generally sufficient to provide enough clearance for blade rotation while maintaining friction on the blade during indexing.

Figure 3B:
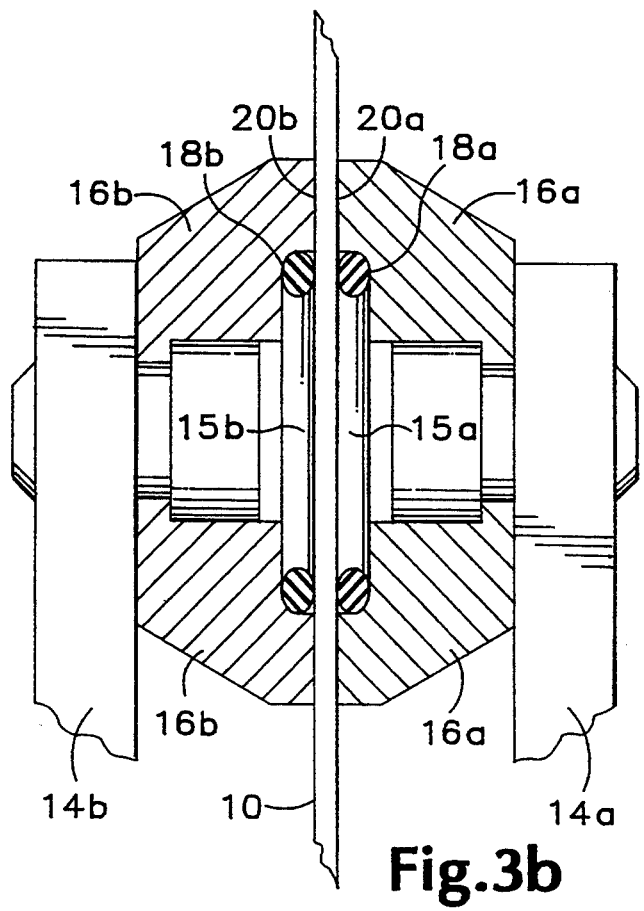
FIG. 3b is the same view shown in FIG. 3a but with pressure increased on the clamping members to hold the saw blade rigidly to allow sharpening thereof.

Referring now to FIG. 3b when the clamp members are fully engaged to hold the blade in place during sharpening, the hard metal second surface portions 20a and 20b are in direct contact with the blade 10 while the O-rings 19a and 19b are deformed within the recess 15a and 15b. Because the blade 10 is stationary at this time, the metal surfaces 20a and 20b will not scratch or scrape the surface of the saw blade 10.

While the use of rubber O-rings is a convenient way of providing first deformable and resilient surface portions 18a and 18b for the clamp members 16a and 16b, the resilient and deformable first surface portions could be formed in other ways. For example, rubber or some other deformable and resilient material could be inserted into cutout portions of any shape machined into surfaces 20a and 20b. Alternatively, a deformable pad that is merely glued or affixed in some other way to the clamp members 16a and 16b could also be employed. An example of such a material is felt. Other deformable or crushable and resilient materials could be used. What is important about such materials, however, is that they be capable of frictionally engaging the blade without scratching or marring the coating on the blade.

Figure 4:
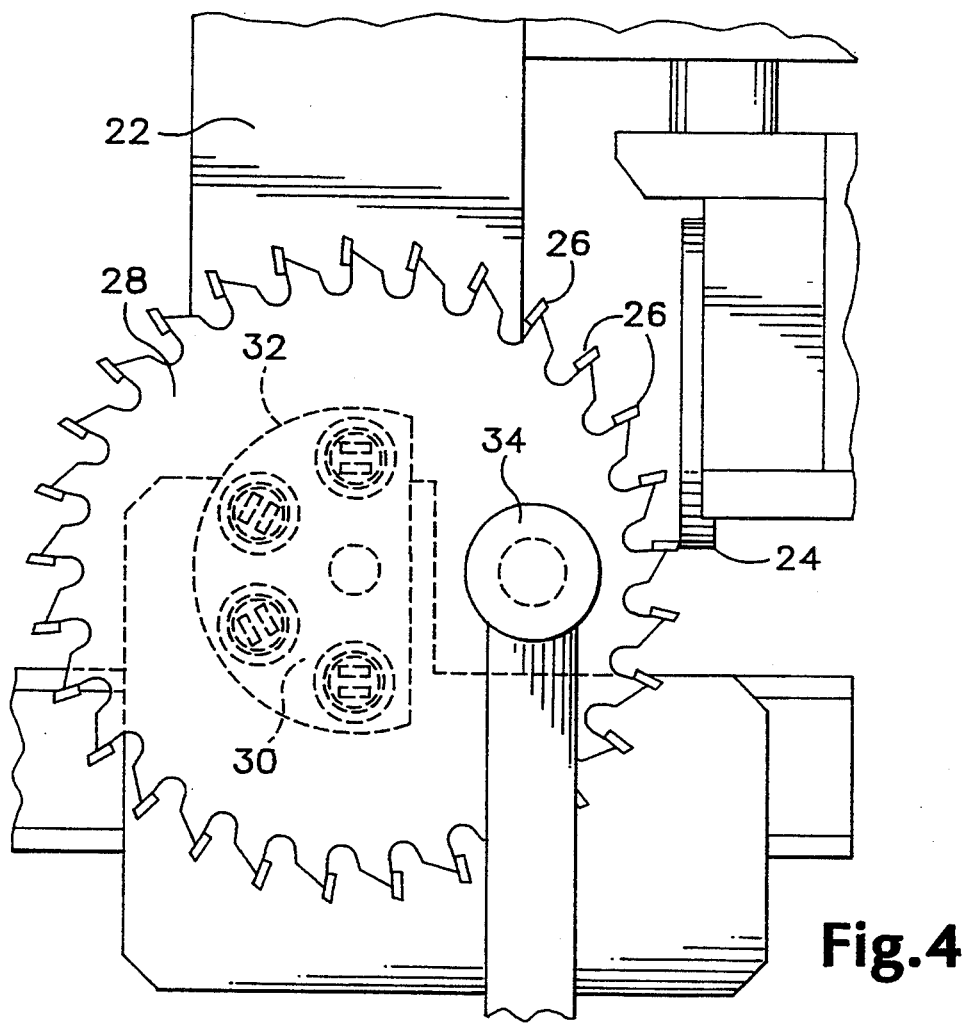
FIG. 4 is a partial side view of a saw regrinding machine employing a magnetic slip clutch.
Figures 5, 6:
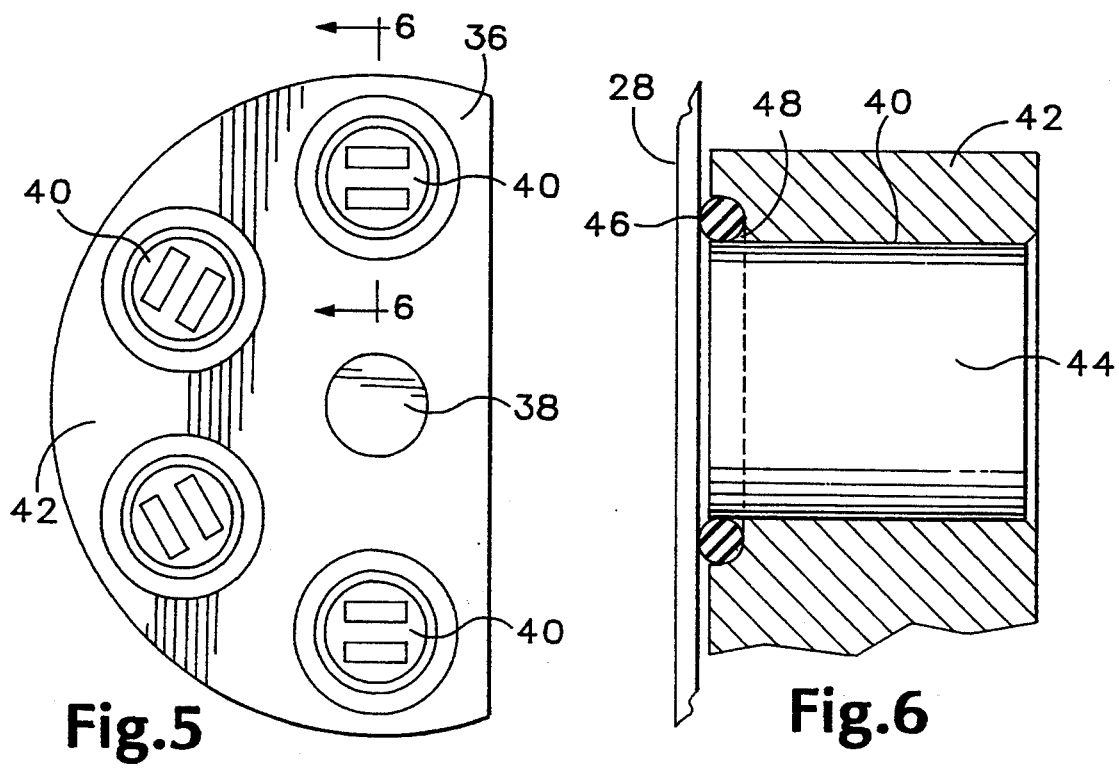
FIG. 5 is a side elevation view of the magnetic slip clutch shown in phantom outline in FIG. 4.
FIG. 6 is a partial side cutaway view taken along line A—A of FIG. 5.

A second embodiment of the invention is shown in FIGS. 4, 5, and 6. Referring to FIG. 4 a top grinding machine 22 includes a grinding wheel 24 for grinding the teeth 26 of a circular saw blade 28. The circular saw blade 28 is mounted for rotation on a slip clutch assembly 30 which includes a slip clutch member 32 (shown in phantom outline in FIG. 4). The blade is held stationary during sharpening by a side clamp assembly 34.

Referring to FIG. 5, the slip clutch member 32 is mounted on a central axis 38 and includes magnet members 40 distributed within a body of hard material 42 made of metal or hard plastic. Referring to FIG. 6, each of the magnet members 40 include a cylindrical magnet 44 inserted into the body of material 42. A rubber O-ring 46 is inserted around each of the magnets 44 in a shallow annular recess 48. As in the case of the side clamp members of FIGS. 3a and 3b, the rubber O-rings 46 project outwardly from the hard surface of the body of material 42 and from the magnet 44 by approximately ten thousandths of an inch.

The slip clutch assembly 30 operates according to the principle described in the aforementioned U.S. Pat. No. 5,152,193. In order to index the blade, the slip clutch member 32 rotates while the blade 28 is held in place by an index finger mechanism (not shown). At the same time, the slip clutch member 32 is in continuous contact with the surface of the blade 28. The only surface portion actually engaging the blade 28, however, is formed by the rubber O-rings 46. Neither the hard plastic portion 42 nor the magnets 44 ever actually touch the blade 28. Thus, the blade 28 can be indexed and sharpened without the risk of the scarring or scratching of its surface.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a saw regrinding machine having a circular saw blade mounted for rotation about an axis thereof, a side clamp assembly being laterally offset from the axis for frictionally engaging the blade during a regrinding operation, said side clamp assembly having a pair of clamping members, each having a clamping surface, wherein said clamping surfaces each include a first surface portion formed of a resilient compressible material and a second surface portion comprising a rigid noncompressible material, the first surface portions forming outward protrusions in the second surface portions.

2. The side clamp assembly of claim 1 wherein said first surface portion is formed from a rubber O-ring.

3. The side clamp assembly of claim 1 wherein the first surface portion protrudes outwardly from the second surface portion toward said saw blade by about 0.010".

4. The side clamp assembly of claim 2 wherein the rubber O-ring is inserted into a recess journalled into the second surface portion of the clamping member.

5. The side clamp assembly of claim 4 wherein the second surface portion is disposed radially outwardly from the rubber O-ring.

6. The side clamp assembly of claim 5 wherein the a recess is large enough to permit compression of the rubber O-ring to thereby allow contact between the second surface portion and the saw blade during a regrinding operation.

7. In a saw regrinding machine including a circular saw blade mounted for rotation about an axis and including an indexing assembly, said indexing assembly including a magnetic slip clutch for magnetically engaging the saw blade, said magnetic slip clutch including an engagement surface portion for frictionally engaging the saw blade during rotation thereof, said engagement surface portion being formed of a resilient compressible material.

8. The improvement of claim 7 wherein said magnetic slip clutch includes a second surface portion formed of a hard noncompressible material, the engagement surface portion protruding from the second surface portion.

9. The improvement of claim 7 wherein said magnetic slip clutch includes a plurality of magnet members and said first surface portion is comprised of a plurality of rings surrounding each respective one of said magnet members.

* * * * *